(12) United States Patent
Lubgins et al.

(10) Patent No.: US 7,877,893 B2
(45) Date of Patent: Feb. 1, 2011

(54) MEASUREMENT OF MICROMOVEMENTS

(75) Inventors: Bonifatijs Lubgins, Riga (LV); Leonids Bekers, Riga (LV)

(73) Assignee: A-Metrics, LLC, Charlotte, NC (US)

( * ) Notice: Subject to any disclaimer, the term of this patent is extended or adjusted under 35 U.S.C. 154(b) by 0 days.

(21) Appl. No.: 12/853,169

(22) Filed: Aug. 9, 2010

(65) Prior Publication Data

US 2010/0299949 A1    Dec. 2, 2010

Related U.S. Application Data

(63) Continuation of application No. 12/090,610, filed as application No. PCT/IB2006/003209 on Oct. 17, 2006, now Pat. No. 7,774,952.

(30) Foreign Application Priority Data

Oct. 17, 2005    (GB)    ................................ 0521076.0

(51) Int. Cl.
    *G01B 7/14* (2006.01)
(52) U.S. Cl. .............................. 33/788; 33/706; 33/551
(58) Field of Classification Search .................... 33/788,
        33/556, 706, 700, 709, 551, 553–555, 738,
                                33/774, 793, 802, 806, 832
    See application file for complete search history.

(56) References Cited

U.S. PATENT DOCUMENTS

| | | | | |
|---|---|---|---|---|
| 5,101,572 A | * | 4/1992 | Kwong et al. | ................ 33/558 |
| 5,111,590 A | * | 5/1992 | Park | ............................ 33/502 |
| 5,333,495 A | * | 8/1994 | Yamaguchi et al. | ........... 73/105 |
| 5,885,434 A | * | 3/1999 | Suda et al. | .................... 205/81 |
| 6,604,295 B2 | * | 8/2003 | Nishimura et al. | ............ 33/554 |
| 6,760,980 B1 | * | 7/2004 | Golinelli | ...................... 33/832 |
| 6,935,200 B2 | * | 8/2005 | Bekers et al. | .............. 73/865.8 |
| 7,310,889 B2 | * | 12/2007 | Stamenkovic | ................ 33/503 |
| 7,533,588 B2 | * | 5/2009 | Bekers et al. | .............. 73/865.8 |
| 7,774,952 B2 | * | 8/2010 | Lubgins et al. | ............... 33/788 |
| 2001/0029678 A1 | * | 10/2001 | Golinelli | ...................... 33/556 |
| 2004/0129094 A1 | * | 7/2004 | Bekers et al. | ............. 73/866.1 |
| 2004/0194331 A1 | * | 10/2004 | Haimer | ........................ 33/556 |
| 2005/0274209 A1 | * | 12/2005 | Bekers et al. | ............. 73/866.1 |
| 2009/0293299 A1 | * | 12/2009 | Lubgins et al. | ............... 33/788 |
| 2010/0050837 A1 | * | 3/2010 | Ould et al. | .................... 33/556 |

* cited by examiner

*Primary Examiner*—Yaritza Guadalupe-McCall
(74) *Attorney, Agent, or Firm*—Nelson Mullins Riley & Scarborough, LLP

(57) ABSTRACT

A micromovement measuring device has a first element such as a probe tip or flat plate coupled to a test body (107) the movement of which is to be measured. A second element (104) is located adjacent to the first element, to form a gap (108) therebetween. As the test body and the first element gradually move away from the measuring element, so increasing the size of the gap, the second element is repeatedly moved up, to restore the gap to its original size. These repeated small quantized movements of the measuring element (104) are counted, and are used to provide an indication of how far the test body (107) has moved. In other embodiments, the first element may gradually move toward the second element, with the latter repeatedly moving away.

21 Claims, 15 Drawing Sheets

MEASUREMENT OF MICROMOVEMENTS

CLAIM OF PRIORITY

This application is a continuation of U.S. application Ser. No. 12/090,610, filed on May 4, 2009, which claims priority to Patent Cooperation Treaty Application No. PCT/IB2006/003209, filed Oct. 17, 2006, the entire disclosures of which are incorporated by reference herein.

FIELD OF THE INVENTION

The present invention relates to a device and method for the measurement of micromovements, and in particular although not exclusively to a linear measurement transducer, eg for the detection and recording of displacements down to the sub-Angstrom scale.

BACKGROUND

Previous devices and transducers for measuring micromovements or linear displacements to high degrees of accuracy are known in the field which rely on interferometry, capacitance or quantum tunnelling.

X-ray interferometers currently provide the highest sensitivity down to the picometre scale. However these interferometers are very large, unwieldy and expensive. Accordingly, they are impractical for use in many situations and applications since they require a complex and rigorous mechanical setup and arrangement of components.

Capacitive micromovement measuring devices work by using the change in capacitance caused by a micromovement altering the separation distance between the capacitor's plates. This change in capacitance is detected and used to calculate the amount of displacement of the plates. Generally it is found that the greater the sensitivity of a capacitive micromovement measuring device the narrower the measurement range over which they are able to measure.

USSR Author's Certificate No. 947 626 discloses a micromovement measurement device that calculates micromovements down to the sub micron scale over a relatively large measurement range, of the order 1 millimeter. This device functions based on the detection of a loss of physical and electrical contact between a pair of contacts when a micromovement occurs and the use of a spring to force the contacts back together restoring physical and electrical contact. In this device elastic micro-strain and micro-deformation of the contacts occur due to the spring forcing the contacts together and electro-erosions can take place at the contacts, so affecting their geometry and leading to a reduction of the measuring accuracy and stability of the measurements.

Quantum tunnelling devices such as a scanning tunnelling microscope (STM) suffer from a narrow measurement range of the order of nanometres. This can be broadened by utilizing piezoelectric material to move the STM probe tip. However, for the micromovement to be measured in this manner, it would require piezoelectric material which can be accurately controlled to an extremely high precision. A further problem with STM's are their bulk, complexity and cost which effectively prohibits their use in certain situations and applications.

The closest prior art to the present invention is WO-A-02/42800. This discloses a micromovement measuring device which works by detecting an interruption in a field electronic emission current caused by a test object undergoing a micromovement. A fixing electromagnet and a pulling electromagnet are utilized to bring the tips sufficiently proximal so that the field electronic emission current is restored after the micromovement.

The present invention, in its broadest form, is characterised by those features set out in the characterising portions of the independent claims.

Devices according to the present invention provide highly accurate and sensitive micromovement measurements, both linear and angular. Embodiments of the present invention are able to detect displacements of a few Angstroms, while also providing a relatively large dynamic and substantially linear measuring range, for example up to 1 mm.

Devices manufactured in accordance with the present invention are expected to find applications in a very large number of fields including, though not limited to: pressure sensors including atmospheric pressure sensors, infrasound sensors, soliton wave sensors, shear wave sensors, pressure wave sensors, seismic activity sensors, burglar alarms, thermal sensors, humidity sensors, gravity sensors, accelerometers, force sensors, electric field sensors, magnetic field sensors, and gravity wave sensors.

When movement detection is combined with a micro-actuating device, the number of potential applications increases still further. Currently available actuators working at the nanometre movement range often slip, and it is necessary to monitor their movement with a separate device. Potential applications for a combined actuator and measurement system include the following:

Life Sciences, Medicine and Biology: Scanning microscopy, Patch clamping, Gene manipulation, Cell penetration, Micro dispensing.

Semiconductors and Microelectronics: Nano-metrology, wafer and mask positioning/alignment, critical dimension measurement, micro lithography, inspection systems, vibration cancellation.

Optics, photonics, fibre-Optics metrology and measuring Technology: Fibre optic alignment and switching, image stabilisation, adaptive optics, scanning microscopy, auto-focus systems, interferometry, adaptive and active optics, laser tuning, mirror positioning.

Precision Mechanics and Mechanical Engineering: Fast tool servos, out-of-roundness finishes (boring, drilling, turning), vibration cancellation, smart structures/structural deformation, wear correction, needle-valve actuation, micro-pumps, knife edge control in extrusion tools, micro-engraving systems.

BRIEF DESCRIPTION OF THE DRAWINGS

The present invention may be carried into practice in a number of ways, and several specific embodiments will now be described, by way of example, with reference to the accompanying drawings, in which.

DETAILED DESCRIPTION OF THE PREFERRED EMBODIMENT

Figure 1:
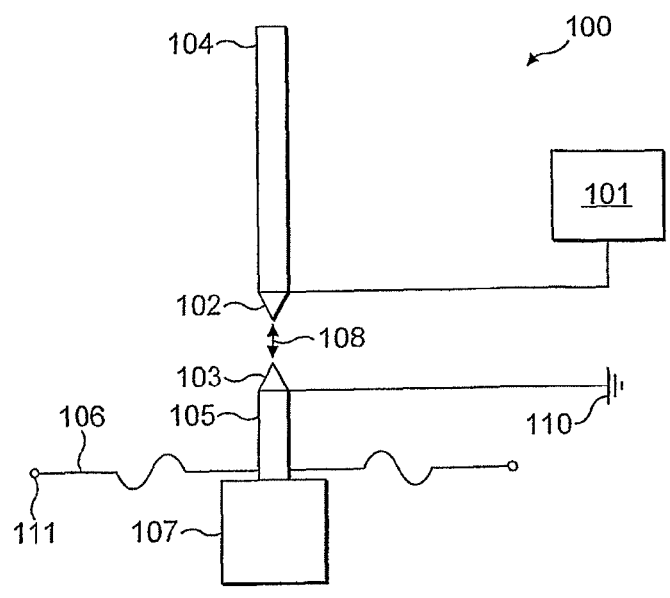
FIG. 1 is a schematic diagram of a measuring circuit as used in a first embodiment of a micromovement measuring device according to the present invention.

FIG. 1 is a schematic diagram of a measuring circuit 100 as used in a first embodiment of a micromovement measuring device according to the present invention.

As is schematically shown in the Figure, the device includes longitudinally aligned moveable measuring and sensitive elements, 104, 105, the elements being closely spaced so that a measuring tip 102 of the measuring element 104 is located adjacent to a sensitive tip 103 of the sensitive element 105. The measuring and sensitive tips are separated by a small gap 108 which may be of the order of a few nanometres or, more preferably, a few Angstroms. A signal processor 101 applies an operating voltage to the measuring tip, causing current to flow (when the gap 108 is sufficiently small) across the gap to the sensitive tip 103, and then to earth 110 the size of the gap 108 at which current will flow clearly depends upon the operating voltage applied to the tip 102, and if the gap is too large no current will flow at all.

The size of the applied operating voltage may be selected by experiment, according to the particular application, but typically a small voltage of less than one volt is applied most preferably in the mV range for example ≦50 mV. This voltage is lower than the voltages which would induce boiling (0.9V), melting (0.43V) and softening (0.08V) in gold tips [Kholm R., Electrical contacts, Moscow, 1961]. Thus, such a low voltage reduces possible distortions at the tips and therefore reduces any resulting measurement inaccuracies due to boiling/melting and softening of the electrical contacts and alteration of their geometry. If higher voltages are used, care should be taken that the voltage is in any event kept sufficiently low so that electron explosion does not occur between the tips, since this may rip atoms from the tips so distorting their geometry and, potentially, introducing uncertainty about the size of the gap as well as introducing unwanted fluctuations and surges in the current that flows across the gap. Tips are preferably conically shaped with an opening angle between 60 and 180.degree. This provides good heat removal from the tips as well as stability of their geometry and thus provides reliable tip performance.

Although the precise physics involved is still not fully understood, it is believed that the current flow which occurs at extremely small spacings is not simply due to quantum tunnelling effects, although quantum tunnelling may indeed occur as well. Typically, quantum tunnelling devices make use of spacings of the order of a few nanometres, where as the present device utilises a gap that may be a factor of 10 smaller, namely a few Angstroms. Preferably a gap 108 may be less than 10 Angstroms, for example approximately five, two or one Angstrom. It may be even possible for gaps of less than one Angstrom to be used. The current that flows across the gap in embodiments of the present invention is referred to as Field Electronic Emission (FEE) current.

Secured to the far end of the sensitive element 105, is a thin flexible membrane 106, which typically may be circular and secured around its circumference by a fixed membrane mount 111. Secured to or abutting the end of the sensitive element 105, on the far side of the membrane from the sensitive tip 103, is a test object 107. The purpose of the device is to detect and to measure extremely small movements of the test object 107.

As will be described in more detail below, with reference to FIGS. 2 to 7, the invention in its various embodiments, measures micromovement by detecting an interruption in the current that flows from the signal processor 101 to ground 110 when the test object 107 moves in the direction of the arrow 112 in FIG. 1. As the test object moves in the direction of the arrow, it is followed by the sensitive element 105, which causes the size of the gap 108 to increase. At a certain point, the size of the gap becomes too large for the current to flow, and the interruption or cessation of current is detected by the signal processor 101. At this point, the measuring element 104 is moved longitudinally, to reduce the size of the gap once again. Once a particular critical spacing has been reached (and before the tips actually touch one another), the current starts to flow again and the measuring element 104 is then locked in position. This process is repeated, with the measuring element 104 gradually following the movement of the test object 107, but in a stepped manner. The signal processor counts those steps, and converts the number of steps into a distance. That distance, then, may be taken as a measure of the distance that the test object 107 has moved.

Figure 2:
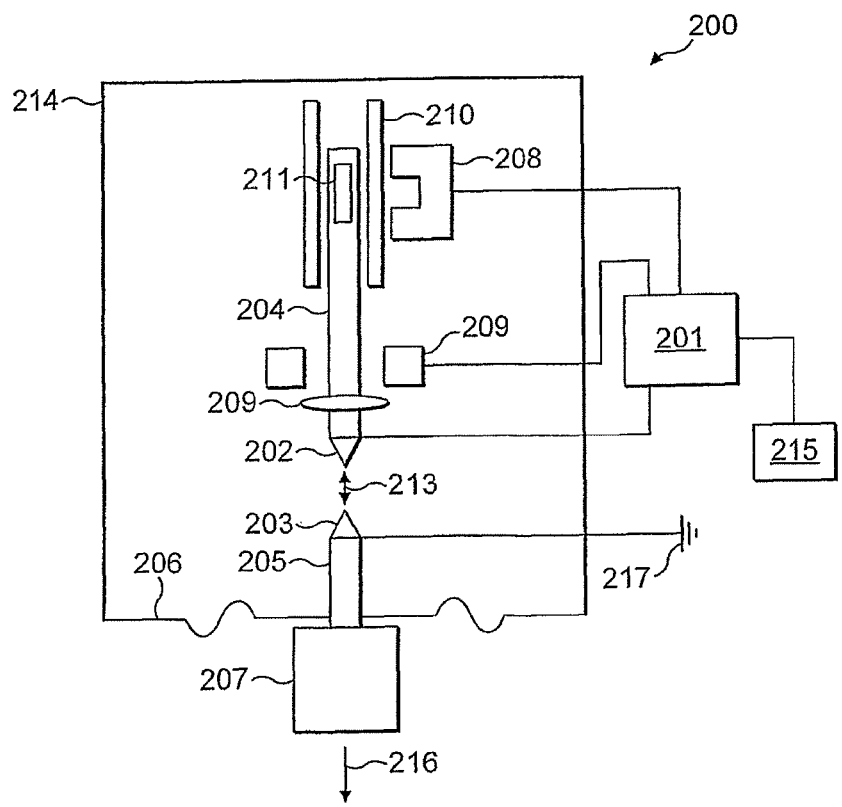
FIG. 2 is a schematic diagram of a first embodiment of a micromovement measuring device according to the present invention.

FIG. 2 is a schematic diagram of a first embodiment 200 of the micromovement measuring device according to the present invention. The device comprises a measuring circuit as detailed above including a signal processor 201, a measuring tip 202, a sensitive tip 203, a moveable measuring element 204, a sensitive element 205, a flexible membrane 206 and a test object 207 that is to be measured for micromovements.

The device further includes a fixing electromagnet 208 a pushing electromagnet 209 and a guiding member 210. The measuring element 204 is housed by the guiding member 210 which freely allows movement of the measuring element in a direction longitudinal of the guiding member whilst preventing transverse movement. The proximal end of the measuring element 204 can be connected to a measuring element support (not shown) in such a way that the measuring element can freely move in a direction longitudinal of the guiding member.

The signal processor 201 is electrically connected to the fixing electromagnet 208.

In this embodiment, the measuring element 204 further includes a section of magnetic material 211 which enables the fixing electromagnet, when energised by an application of an excitation current from the signal processor 201 creating a magnetic field around the fixing electromagnet, to attract the measuring element in a direction towards the fixing electromagnet and perpendicular to the direction longitudinal of the guiding member. This forces the measuring element against the guiding member. As a result of this force and the friction between the measuring element and the guiding member the measuring element may be held in any selected fixed position. By using electromagnets as a means for fixing the measuring element in position, a smooth and controllable clamping force can be applied.

The signal processor 201 is also electrically connected to the pushing electromagnet 209. A collar 212 is attached to the measuring element at the distal end of the measuring element. This collar comprises a magnetic material which enables the pushing electromagnet, when energised by an application of an excitation current from the signal processor creating a magnetic field around the pushing electromagnet, to force the collar and the measuring element in a direction longitudinally of the guiding member towards the sensitive element, thereby reducing the tip separation distance 213 between the measuring tip and the sensitive tip.

Since the size of the gap 213 will typically be very small, it is desirable that the measuring and sensitive tips 202, 203 are protected from unwanted external influences, including dust particles and pollutants or oxygen within the atmosphere which could cause corrosion. To that end, in the embodiment of FIG. 2, all of the moving parts of the device are housed within a hermetic chamber 214, containing a suitable inert gas for example Helium. An inert gas within the hermetic chamber 214 prevents cold welding of the sensitive and measuring tips and dampens the force of any impact should the tips come into contact. Furthermore, an inert gas eliminates the formation of films on the measuring and sensitive tips' operating surfaces, the region on the tip edges where FEE occurs, which could alter the FEE current characteristics. In the FIG. 2 embodiment, the flexible membrane 206 defines one face of the chamber. Although not shown, it would also be possible to provide an additional flexible membrane secured to the measuring element 204, so that the fixing and/or pushing electromagnets 208, 209 could be located outside the chamber. It would also be possible, of course, for the signal processor 201 to be located within the chamber, rather than outside as is shown in FIG. 2.

In an initial state, the signal processor 201 applies an excitation current to the fixing electromagnet 208 energising it and causing it to hold the measuring element 204 in a fixed position. The signal processor 201 simultaneously supplies an operating voltage to the measuring tip 202. Assuming that the gap 213 is sufficiently small, a FEE current arises between measuring and sensitive tips. Hence a current, detectable by the signal processor, flows through the measuring circuit: from the signal processor 201 to the measuring tip 202 to the sensitive tip 203 and then to earth 217. The device remains in this stable state until a micromovement of the test object 207 occurs.

When a measurable micromovement occurs, (e.g. the test object 207 contracts or is moved in a direction away from the measuring element), this causes the sensitive element, being connected to the test object, also to undergo a micromovement away from the measuring element. This results in the separation distance between the measuring and sensitive tips to increase which interrupts the FEE current. The signal processor detects this interruption of the current and removes the excitation current from the fixing electromagnet 208 and applies an excitation current instead to the pushing electromagnet 209.

The simultaneous releasing of the measuring element 204 and the excitation of the pushing electromagnet 209, forces the measuring element to move longitudinally in a direction which tends to close the gap 213. Movement continues until the size of the gap becomes sufficiently small for the FEE current to start flowing again. As soon as the signal generator 201 detects a current which is higher than a preset threshold level, it automatically removes the excitation current from the pushing electromagnet 209 and simultaneously reapplies an excitation current to the fixing electromagnet 208. As previously mentioned, this change of state will occur before the measuring tip and the sensitive tip are brought into actual physical contact.

This process of alternately changing states of the fixing and pushing electromagnets by sequentially energizing one and de-energizing the other, allows the device to repeatedly switch between a static mode in which the measuring element is locked in position, and a free mode in which the measuring element is pushed towards the sensitive element 205. It will be understood, of course, that in both modes the test object 207 may continue to move slowly and gradually in the direction of the arrow 216.

The repeated interruption and restoration of the current caused by micromovements of the test object and the transfer from one stable state to another creates trailing and leading edge pulses in the current flowing through the measuring circuit. These are detected by the signal processor 201 and output to an indicator 215, such as an LCD or computer display, for recordal and/or display.

Each pulse represents a quantization of the micromovement which corresponds to a single movement of the measuring element. Tests carried out on a prototype device have shown that a single pulse can equate to a movement of the sensitive element of as little as 0.5 Angstroms. The size of the micromovement or actual physical displacement recorded is dependent on the combined hysteresis of the fixing electromagnet, the pushing electromagnet and the current.

An advantage provided by devices according to embodiments of the present invention is that, unlike some pulling electromagnet based prior art devices where, to achieve maximal dynamic range, a pulling electromagnet is attached to a membrane, the membrane in embodiments according to the present invention is not impeded by an electromagnet being attached to it. Thus the inertia of the membrane is not increased and the sensitivity of the device and its ability to detect minute forces is not diminished. Furthermore, the measurement accuracy of devices according to embodiments of the present invention is improved over that achieved by devices using pulling electromagnets since, when a pulling electromagnet, which is attached to the membrane, is energised to bring the measuring tip towards the sensitive tip, not only will the measuring tip be moved towards the sensitive tip, but also, since the pulling electromagnet is attached to the membrane as is the sensitive element, the pulling electromagnet itself as well as the membrane and sensitive element will be moved towards the measuring tip. Accordingly, the amount of displacement of the measuring element in a direction towards the sensitive element measured by such a device would not be the same as the amount of displacement undergone by the test object in a direction away from the measuring element. Such an issue does not arise for embodiments according to the present invention.

Suitable alignment and positioning of measuring devices according to the present invention allow micromovement measurements in various directions. The use of two devices orientated diametrically opposite will provide micromovement measurement of both positive and negative displacements of a test object along a selected axis. Suitable alignment and positioning of measuring devices will allow measurements of various components of a micromovement, thereby allowing angular micromovements to be calculated as well as the calculation of gradients of fields such as magnetic fields, electric fields and gravitational fields, enabling the device to function as a gradiometer. Three dimensional micromovements can be measured by appropriate arrangement of three pairs of micromovement measuring devices. Each device within the pair is aligned in the diametrically opposite direction to the other device in the pair, and each pair of devices is aligned along an axis orthogonal to the alignment axis of to the other two pairs.

Figure 3:
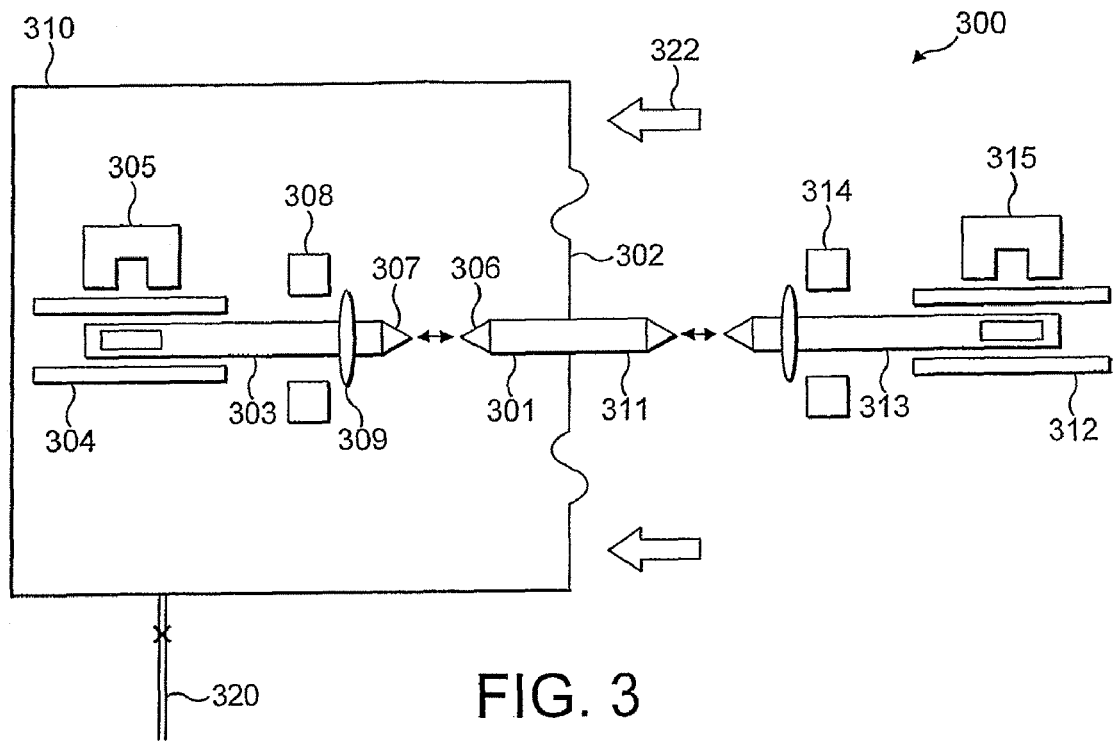
FIG. 3 is a schematic diagram of a second embodiment of a micromovement measuring device according to the present invention.

A second embodiment 300 of a micromovement measuring device according to the present invention, providing for bidirectional measurement, is shown in FIG. 3. This embodiment, which may be particularly suitable for the measurement of air pressure changes, comprises a micromovement measurement device similar to that as discussed above in that it comprises a measuring circuit (not shown) a first sensitive element 301 attached to a flexible membrane 302, a first measuring element 303, housed in a first guiding member 304 and able to be fixed in position by a first fixing electromagnet 305. The first measuring element is positioned adjacent to the sensitive element so that a sensitive tip 306, located on a distal end of the sensitive element, and a measuring tip 307, located on a distal end of the measuring element, are proximal. A first pushing electromagnet 308 is arranged to force a collar 309, made of a magnetic material attached to the distal end of the measuring element, and the measuring element towards the sensitive element. This assembly is housed in a hermetic chamber 310 which is evacuated via a line 320.

The second embodiment further comprises a second sensitive element 311 attached to the opposite side of the membrane. A second guiding member 312 houses a second measuring element 313 which is suitably positioned so that it is proximal to the second sensitive element and aligned along the longitudinal direction of the sensitive element. A second pushing electromagnet 314 is further provided which is able to move the second measuring element towards the second sensitive element. A second fixing electromagnet 315 is provided to fix the measuring element into position.

The external side of the flexible membrane 302 is exposed to atmospheric pressure, as indicated by the arrows 322. Small changes in atmospheric pressure will cause the membrane 302 to flex slightly, thereby causing a rod (consisting of the elements 301, 311) to move either to the left or to the right as shown in the diagram. As the rod moves to the left, the micromovement in that direction is detected and measured by the right hand device; as the rod moves to the right, the micromovement in that direction is detected and measured by the left hand device, within the chamber 310. The respective outputs of the devices may be combined, if required, so as to indicate the overall movement in one direction or the other from a predefined zero position. This may conveniently be achieved by subtracting the number of pulses counted by one of the devices from the number counted by the other.

In an alternative arrangement (not shown) the right hand device of FIG. 3 may also be contained within a hermetic housing to protect the measurement tip and the sensitive tip from dust, corrosion and the like. To ensure that changes in air pressure produce a differential effect between the two devices, the right hand housing may be filled with a suitable inert gas, while the left hand device contains a vacuum.

Figure 4:
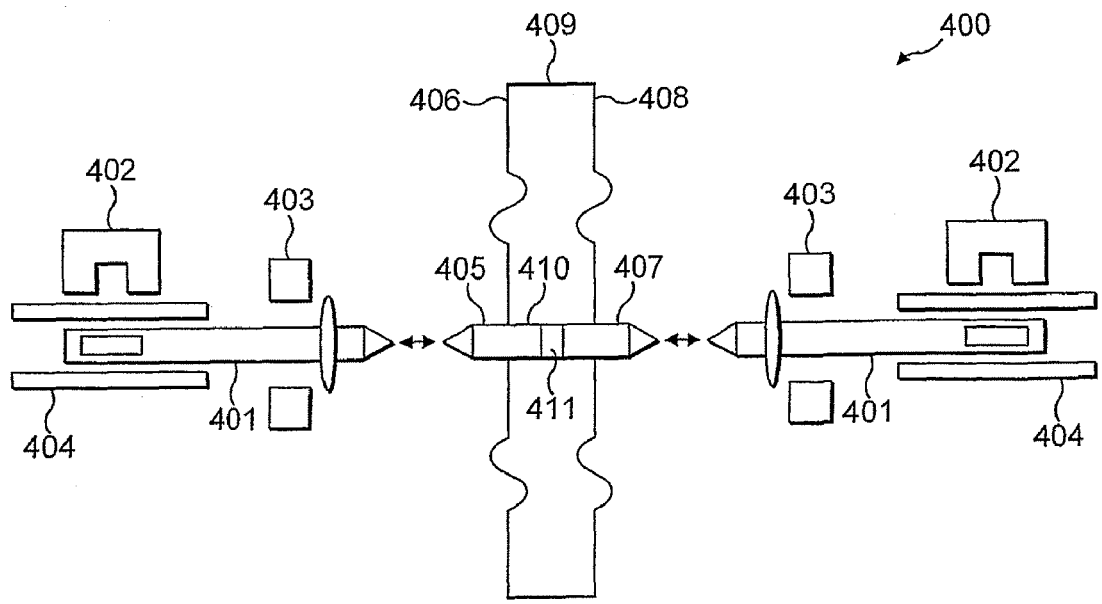
FIG. 4 is a schematic diagram of a third embodiment of a micromovement measuring device according to the present invention.

FIG. 4 shows a third embodiment of a micromovement measuring device 400 according to the present invention that also provides for bidirectional measurement. As with to the device of the third embodiment, there are provided two measuring elements 401, two fixing electromagnets 402, two pushing electromagnets 403 and two guide members 404. However in this embodiment a first sensitive element 405 is attached to a first membrane 406 and a second sensitive element 407 is attached to a second membrane 408. The membranes are mounted in a frame 409 and centrally connected together with a connecting rod 410 to which is attached the test object 411 to be measured for micromovement.

In operation, as the test object 411 moves to the left or to the right, as shown in the Figure, that movement is detected and measured respectively by the right hand or by the left hand unit.

In a practical embodiment, it may be desirable for either or both of the measuring units to be protected by means of a hermetic housing (not shown). As with the third embodiment, the two separate outputs can be combined, if required.

Figure 5:
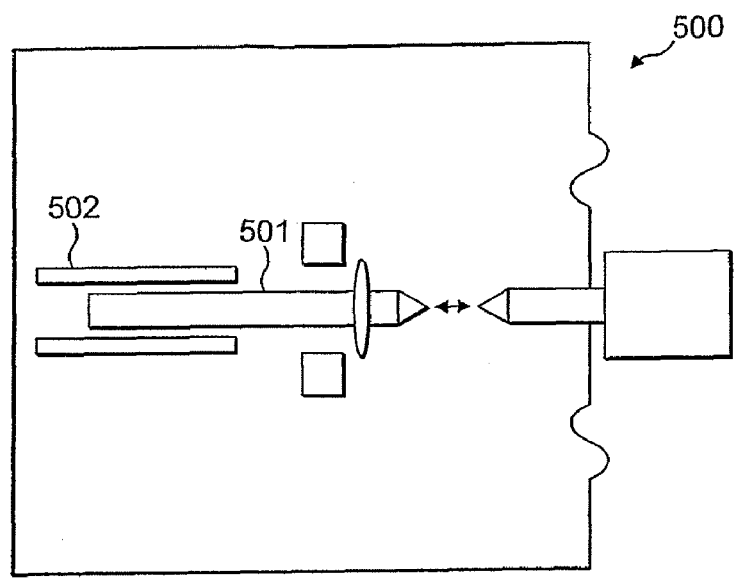
FIG. 5 is a schematic diagram of a fourth embodiment of a micromovement measuring device according to the present invention.

A fourth embodiment of a micromovement measuring device 500 according to the present invention is shown in FIG. 5. In this embodiment yet another alternative fixing mechanism is shown. Here the device is orientated so that the longitudinal axis of the measuring element 501 is aligned parallel to that of the ground and gravity acts in a direction perpendicular to the longitudinal axis of the measuring element. In this set up, the need for a fixing electromagnet is removed, its part now being played by gravity. The gravitational force urges the measuring element against the guide member 502 and the resulting friction impedes the measuring element's movement in a direction longitudinal of the guide member.

Figure 6:
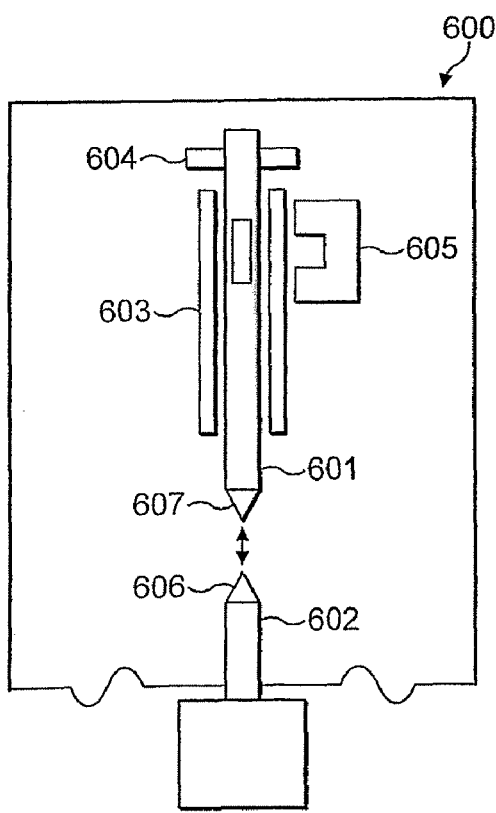
FIG. 6 is a schematic diagram of a fifth embodiment of a micromovement measuring device according to the present invention.

A fifth embodiment of a micromovement measuring device 600 according to the present invention is shown in FIG. 6. In this embodiment, the pushing electromagnets are omitted. The device is orientated so that the longitudinal axis of the measuring element 601 is aligned perpendicular to the ground and gravity acts in a direction parallel to the direction of the longitudinal axis of the measuring element. In this set up, the need for a pushing electromagnet, forcing the measuring element towards the sensitive element 602 is removed, its part now being played by gravity. Simply put, gravity forces the measuring element in a direction longitudinal of the guide member 603. Suitable arrangements may be placed to prevent the measuring element from falling out of the guide member such as pins 604 attached to the measuring element which limit the movement of the measuring element along the guiding member.

The fixing electromagnet 605 is suitably energised to fix the measuring element in position when it is sufficiently close to the sensitive element that a current is able to flow between the sensitive and measuring tips 606, 607.

Figure 7:
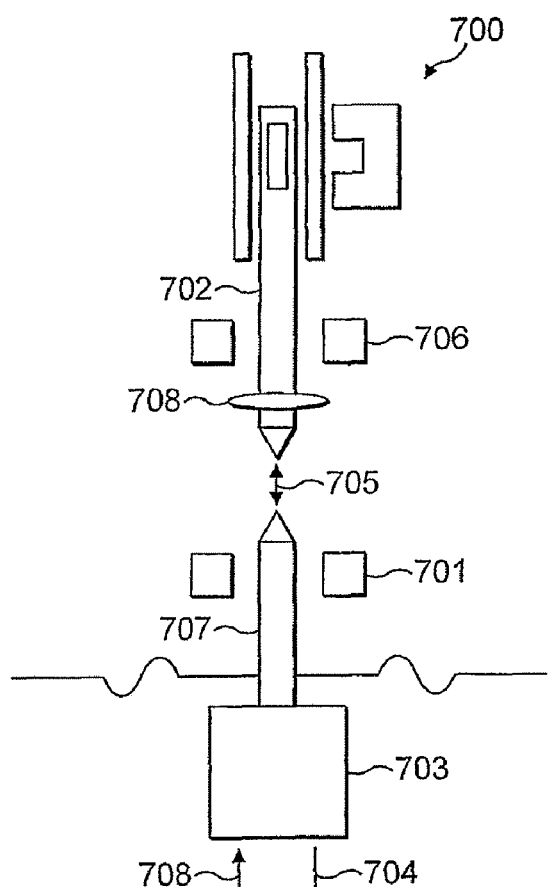
FIG. 7 is a schematic diagram of a sixth embodiment of a micromovement measuring device according to the present invention.

A sixth embodiment of a micromovement measuring device 700 according to the present invention is shown in FIG. 7. There are a first set of pushing electromagnets 706 and a second set of pushing electromagnets 701. The additional electromagnets 701 are disposed so that, when energised, they exert a force on the measuring element in an opposite direction to the force exerted by the pushing electromagnets 706 when they are energised. For example, the first electromagnets 706 may be located above the collar 708 and second electromagnets 701 may be located below the collar. Thus bi-directional longitudinal movement of the measuring element 702 is possible using only a single measuring element 702.

If the test object 703 moves in the direction of the arrow 704, which increases the gap 705 to a tip separation distance such that an FEE current no longer flows, or drops below a lower threshold value, the pushing electromagnets 706 are energised to push the measuring element 702 towards the sensitive element 707 until an FEE current is restored or is raised above the lower threshold value. At this point the energising current to the pushing electromagnet 706 ceases and the measuring element is then fixed. If the test object 703 moves in the direction of the arrow 708, which decreases the gap 705 such that the FEE current rises above an upper threshold level, and before actual physical contact of the tips, the pushing electromagnets 701 are energised to push the measuring element 702 away from the sensitive element 707 until the FEE current falls below the upper threshold value. At this point the energising current to the pushing electromagnets 701 ceases and the measuring element is fixed.

Alternatively, both electromagnets could be arranged to pull the measuring element 702. Electromagnets 701 could pull the measuring element 702 in a direction 704 for a micromovement in this direction. Likewise electromagnets 706 could pull the measuring element 702 in a direction 708 for a micromovement in this direction.

In a further alternative, one of the electromagnets 701 could be arranged to pull the measuring element and the other electromagnet 706 could be arranged to push the measuring element in the event of a micromovement in the direction of the arrow 704. For a micromovement in the direction of the arrow 708, the energising currents through the electromagnets 706 and 701 could be reversed so that electromagnet 701 pushes and electromagnet 706 pulls the measuring element in the direction 708.

In a seventh embodiment of a micromovement measuring device according to the present invention, there is only one set of electromagnets which cause the longitudinal movement of the measuring element. The arrangement of such a device is similar to that shown in FIG. 2, with the electromagnets 209 being arranged to operate as both push and pull electromagnets. This can be done by reversing the energising current.

Alternatively, gravity could supply a downward force on the measuring element and the electromagnet 209 could supply an upward force to the measuring element. Depending on the location of the electromagnet 209, be it disposed above the magnetic collar 212 (as is shown in FIG. 2) or below the magnetic collar 212 (not shown), such the electromagnet 209 need only be a pull or push electromagnet respectively. Obviously, a skilled person in the art would appreciate the appropriate changes in the energising currents that would be necessary if the device were to be rotated 180.degree.

The embodiments described above, with their ability to control the movement of the measuring element in two directions and to detect the FEE current varying past threshold values, enables the possibility of setting up a feedback loop. Such a feedback loop can be set up where the tip separation gap is increased or lowered when the FEE current fluctuates above or below threshold FEE current values respectively. The feed back loop allows for the bidirectional detection and measurement of micromovements using only a single measuring element.

An alternative mode of operation to the static/free mode described above, which is capable of being adopted in each of the embodiments, is an analogue measuring mode. In this mode of operation analogue measurements of the displacement are made instead of the stepped or quantised measurements of the static/free mode of operation. As with the static/free mode of operation, the measuring tip and sensitive tip are brought into sufficient proximity so that an FEE current arises, and the measuring element is then fixed. However, when a micromovement occurs, instead of freeing the measuring element and moving it towards the sensitive element, the signal processor merely detects and records the change in FEE current characteristics, e.g. value of current. The change in current characteristics corresponds to a change in tip separation distance due to the micromovement. This mode of operation is particularly useful for detecting and measuring micromovements and waves of extremely small amplitude since upper and lower FEE current thresholds no longer need to be reached before a micromovement is detected and recorded. Also, high frequency amplitude micromovements and waves can be measured and detected.

In all of the previously described embodiments, alternative clamping arrangements could be used instead of fixing electromagnets. Although electromagnetic clamping is preferred, because of its high level of controllability, alternative clamps including piezoelectric clamps are not excluded.

In all of the described embodiments, suitable filters (not shown) may be provided to filter and/or smooth the current within the circuit, prior to its detection and/or measurement. Such filters could be electrical or electronic. Alternatively, some unwanted signals may be filtered out by mechanical means. For example, by suitable choice of the mass of the various components, and the mechanical characteristics of the membrane, high frequency vibrations or other rapid movements could be; filtered out, allowing the system to concentrate on measuring any slow underlying movement of the test object. It is possible for any embodiment to not include a membrane and instead to have the sensitive element in direct communication with the test object. Alternatively, instead of a membrane, strings or resonators could be used.

To improve further the maximum sensitivity and accuracy of the described embodiments, it is preferable to maintain the device or at least the operating parts of the (device, such as those components which are within the hermetic housing), at a low temperature, e.g. below 80K. Keeping the device at low temperatures, for example by immersion in liquid Nitrogen or liquid Helium, reduces Schottky noise, crystal lattice vibrations and thermal fluctuations.

Devices according to the present invention may find useful application in a large number of different fields, some of which will be described below.

Figure 8A:
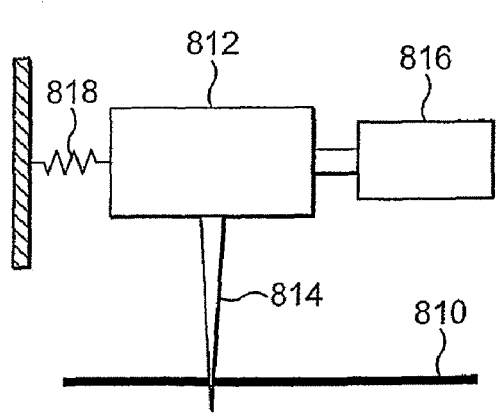
FIGS. 8A, 8B, 8C, 8D and 8E show various applications of micromovement devices according to embodiments of the present invention.

FIG. 8A shows a device being used to measure transverse or shear waves within a substrate 810. Typically, the substrate may be the ground, in which case the arrangement illustrated in FIG. 8A may be used for the detection of shear waves resulting from an earthquake. In the arrangement shown, a measurement device 816 is coupled to a reaction mass 812 which is itself securely anchored by means of a spike 814 within the substrate 810. A spring 818, coupled to the reaction mass, may be provided if required for stabilisation.

Figure 8B:
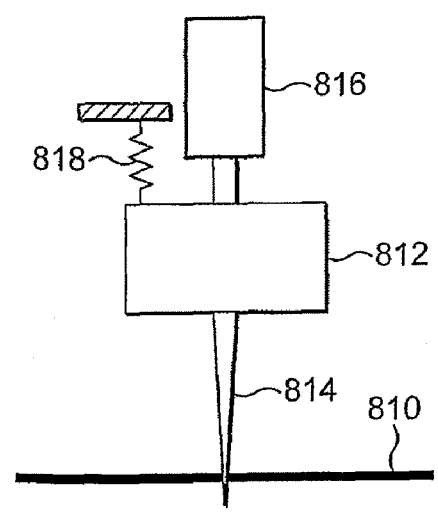

An analogous arrangement for measuring vertical or pressure waves within a substrate 810 is shown in FIG. 8B, in which the same reference numerals have been used as in FIG. 8A. The devices of FIGS. 8A and 8B are particularly suitable for detecting and recording solitons, creeping and dynamical infraprocess in nature and engineering. Examples include registering baric trends in meteorology, solitons in geology and oceanography (e.g. for forecasting storms), hurricanes, tornadoes, earthquakes, volcanic eruptions, landslides, tsunamis; measuring solitons and creep in construction, buildings, bridges, dams, tunnels, bridges; precision engineering components (e.g. jet turbine blades) as well as detecting leakage of liquids and gases from containers (e.g. gas leaking from a spacecraft).

Figure 8C:
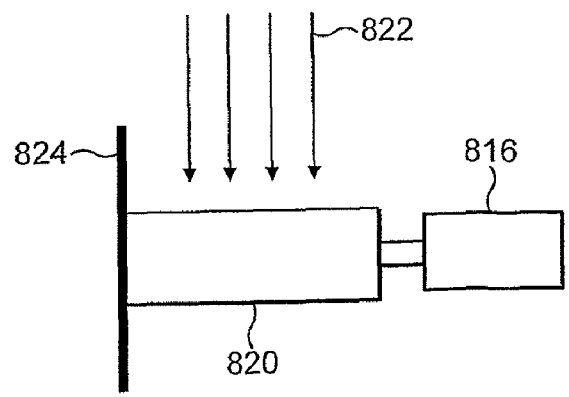

FIG. 8C shows a device which is used to measure thermal radiation. In this arrangement, a thermally reactive member 820 expands or contracts in dependence upon the level of incident radiation 822. Movement of one end of the member 820 is constrained by a fixed surface 824, thereby causing the opposite end of the member to move. This movement may be detected in the usual way be a device 816, which accordingly acts as a thermal sensor. A similar arrangement can be used to detect humidity or moisture, where the member 820 is reactive to water vapour (that is, where it expands or contracts in dependence upon the ambient air's water vapour content).

Figure 8D:
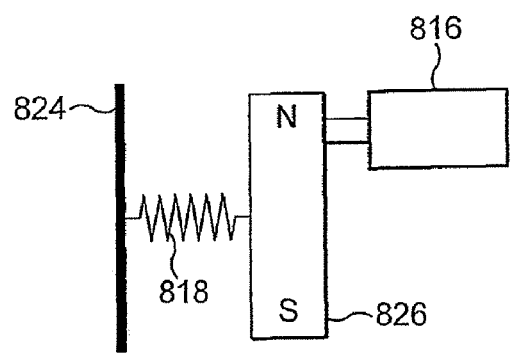

FIG. 8D shows an arrangement in which the device is used to measure magnetic fields. The measurement device 816 is coupled to a sprung bar magnet 826. The presence of an external magnetic field will cause the magnet to deflect, this deflection being measured by the device 816.

Figure 8E:
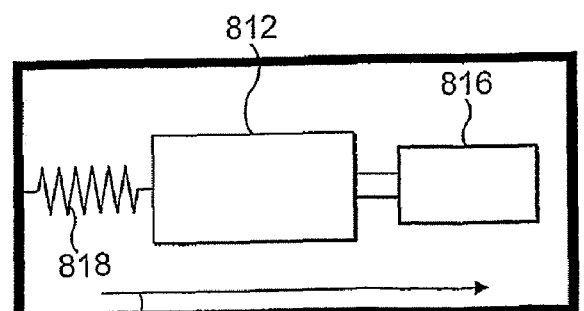

Finally, FIG. 8E shows a device arranged to act as an accelerometer. In this arrangement, a housing 824 is provided within which is a reaction mass 812 and a spring 818 coupled to the housing. The reaction mass 812 is further coupled to a micromovement measuring device 816. When the housing is accelerated in the direction of the arrow 830, the reaction mass will tend to move backwards within the housing so compressing the spring 818. This movement is detected by the device 816 (which may be fixed to the housing). In the arrangement shown, the force acting to compress the spring will be proportional to the acceleration, and the deflection of the reaction mass 812 will also be proportional to the acceleration. Hence, the acceleration can be measured directly simply by determining the amount of movement that has occurred. Furthermore, with knowledge of the mass of the reaction mass 812, such a device can be used to detect and measure forces transmitted to the reaction mass 812.

We turn now to a variety of more sophisticated embodiments. In these embodiments, it has been found convenient to replace the first (eg sensitive) element 105, 205 of the previous embodiments with a flat gold plate. The second (eg measuring) element or pin is also of gold in the best embodiments currently available, although it is expected that other pin materials such as platinum may also be effective. Although the precise physics of the pin/plate interaction have not yet been studied in detail, it is believed that improved performance can be achieved by providing the pin with a relatively sharp tip. It is not, however, necessary for the tip to be sharpened to the atomic level, and it has been found in practice that the device operates perfectly satisfactory even when the shape of the tip is such that there are multiple points between the pin and the plate across which the current may flow. It is clear, in other words, that the device operates even when the pin tip is relatively blunt when considered at the atomic level. In any practical embodiment, it is expected that the tip of the pin will be sufficiently blunt, at the atomic level, to generate multiple tunnelling.

In the some embodiments, the pin may be mounted for movement in a cylindrical guiding member 210 (see for example FIG. 2). In an improved embodiment however, shown in FIG. 9, the pin 906 is mounted for longitudinal movement on two circular supporting discs 902, 903. Each disk has a central square hole 904, so positioned that the pin 906 rests upon two of the edges 908, 910. The disks 902, 903 may themselves be gold, and are preferably thin to limit the area of contact between the pin and the edges 908, 910. The thickness of the supports may be chosen according to the physical characteristics that the system is desired to have. Tests have been carried out with a prototype having a support thickness of 0.7 mm, and it is believed that performance may be increased by reducing the thickness to perhaps 0.1 mm.

The precise role played by the friction between the pin and the supports on the overall performance of the device is not fully understood at present, but it is believed that straightforward experimentation will fairly rapidly establish an optimal support width. Likewise, straightforward experimentation should be able to establish the preferred combination of materials for the pin/supports, for example gold/gold, platinum/platinum, platinum/gold, gold/platinum or some combination of other materials.

Figure 10:
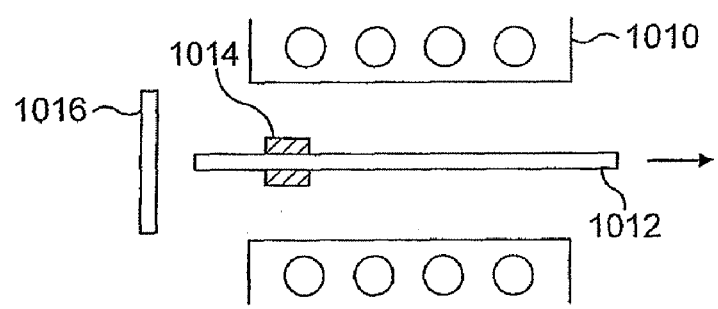
FIG. 10 shows an arrangement in which the pin is pulled away from the plate when the coil is energised.

There are a variety of ways in which the pin may be caused to move, one of which is an electromagnetic coil or several coils, as previously described. However, other types of actuator are equally envisaged, including electrostatic actuators and/or piezoelectric actuators such as lead zirconium titanate (PZT) actuators.

Where an electromagnetic coil is used for actuation, one particularly convenient arrangement is shown in FIG. 10. Here, the pin 1012 has a soft iron core or collar 1014 surrounding it. Both the pin and core are largely contained within the coil 1010, with the core being so positioned that when the coil is actuated, the pin 1012 is pulled away from the plate 1016.

Figure 11:
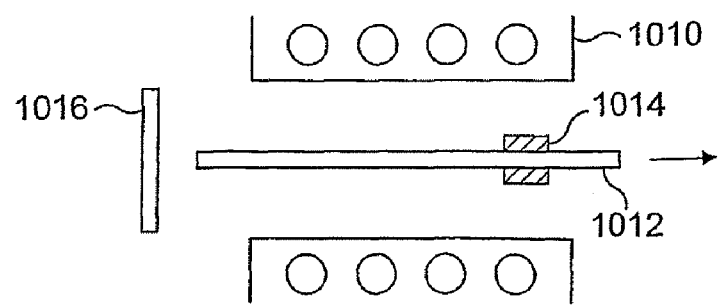
FIG. 11 shows an alternative arrangement in which the pin is pulled toward the plate when the coil energised.

In an alternative embodiment, shown in FIG. 11, the core 1114 is located at the far end of the pin 1112, away from the plate 1116. In this arrangement, when the coil 1110 is actuated, the pin is driven towards the plate.

In yet an alternative arrangement, the core 1014, 1114 could be magnetised. In such a case, the direction that the pin moves depends upon the polarity of the voltage applied to the coil. By including suitable switching circuitry, the coil could then be selectively energised in a first direction, to draw the pin to the plate, or in a second direction, to draw the pin away from the plate.

FIGS. 12 to 15 show a variety of embodiments which make use of two pins to provide bi-directional operation.

Figure 12:
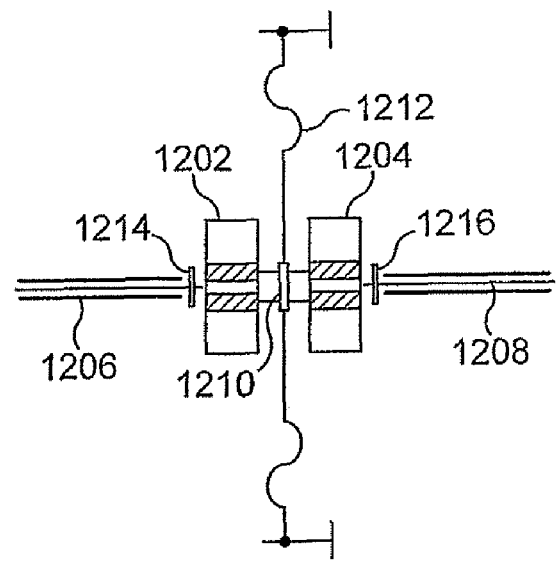
FIG. 12 shows a pull-on arrangement with two pins.

FIG. 12 shows a pull-on configuration in which first and second coils 1202, 1204 are used to pull first and second pins 1206, 1208 toward a central plate 1210 mounted on a flexible metal membrane 1212. In this arrangement, the coils act on respective cores or washers 1214, 1216, which are mounted to the pins.

Figure 13:
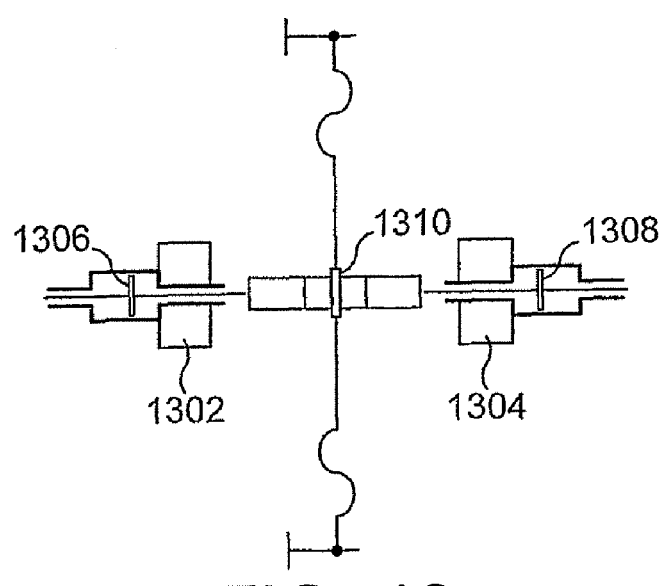
FIG. 13 shows an alternative push-on arrangement.

FIG. 13 shows a push-on configuration in which the coils 1302, 1304, when energised, attract respective cores 1304, 1306, to push the pins toward the central plate 1310.

Figure 14:
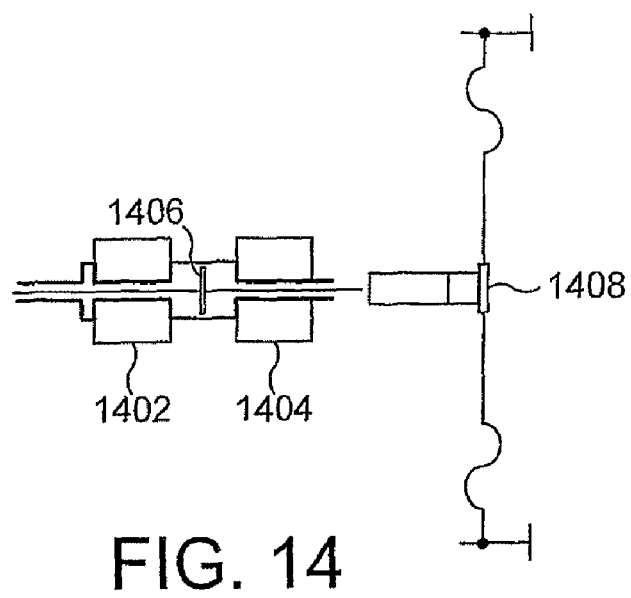
FIG. 14 shows an alternative pull-pull arrangement.

FIG. 14 shows a pull-pull configuration in which actuation of a first coil 1402 attracts the core 1406, to pull the pin away from the plate 1408. Actuation of a second coil 1404 attracts the core 1406 and pulls the pin towards the plate.

Figure 15:
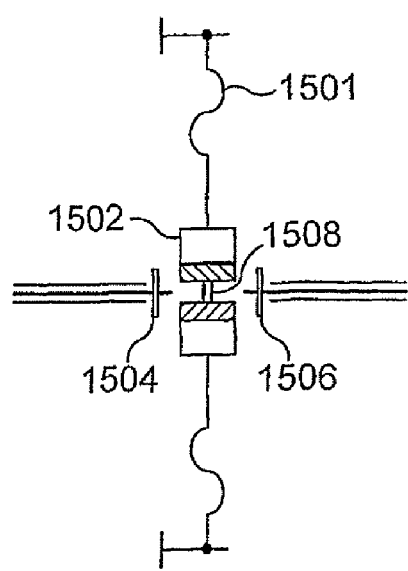
FIG. 15 shows an alternative pull-on configuration in which the coil is mounted to the membrane.

An alternative pull-on arrangement is shown in FIG. 15, which makes use of a single coil 1502 mounted to the membrane 1501. When the coil is actuated, the coils 1504, 1506 are pulled towards the central plate 1508.

Figure 9:
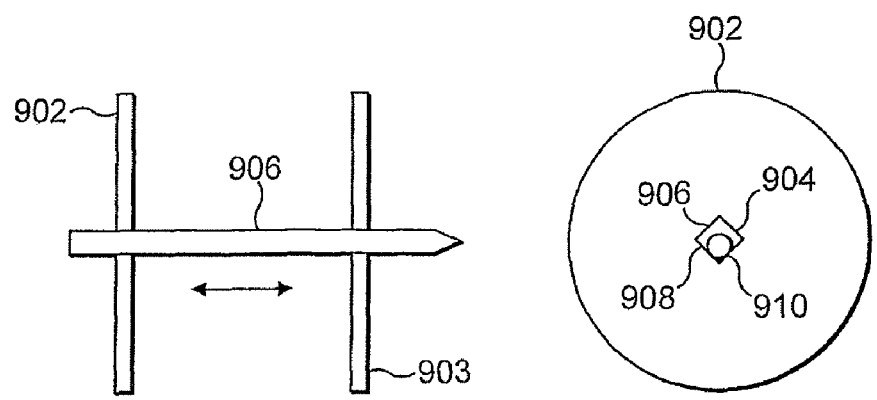
FIG. 9 shows the way in which the pin may be supported.

It will of course be understood that any of the embodiments of FIGS. 12 to 15 may, if required, make use of the mounting arrangement shown in FIG. 9 and/or where applicable the coil arrangements of FIGS. 10 and 11.

Figure 16:
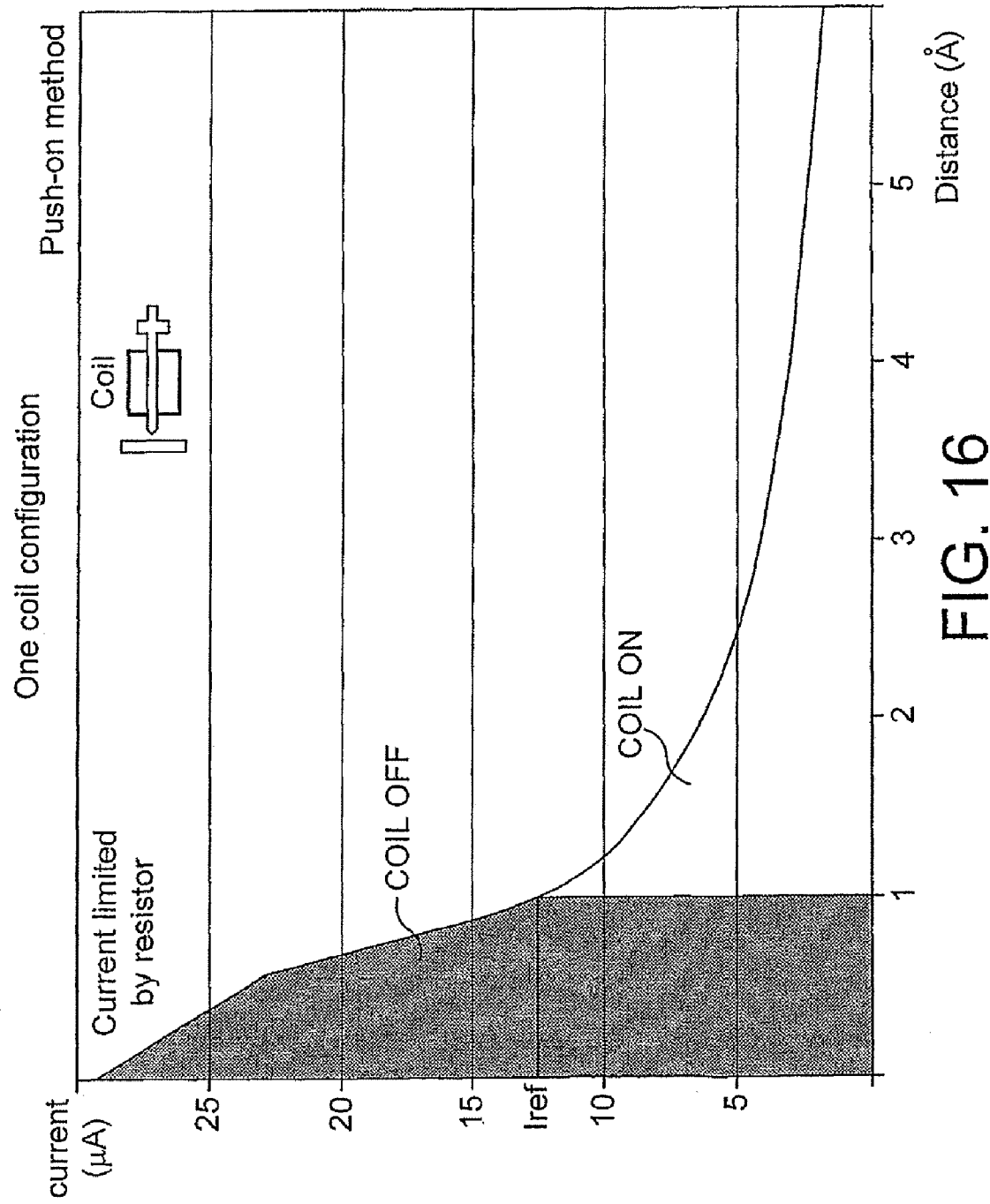
FIG. 16 illustrates the operation of a single coil configuration.

FIG. 16 illustrates schematically the way in which the current passing between the pin and the plate varies with distance. In a simple one-coil configuration, for example the push-on method, the control electronics may define a single current limit or threshold $I_{ref}$ at which the coil is turned on and off. More complex arrangements (not shown) are also envisaged, whereby two separate current limits are maintained. With the push-on method, one limit is that at which the pin is stopped as it is being pushed toward the plate, and the second that at which the pin is released as the distance gradually increases due to movement of the plate. With the pull-off method, the first limit is that at which the pin is released when the distance between the pin and the plate becomes sufficiently small, and the second is that at which the pin is stopped once it has moved sufficiently far from the plate.

Figure 17:
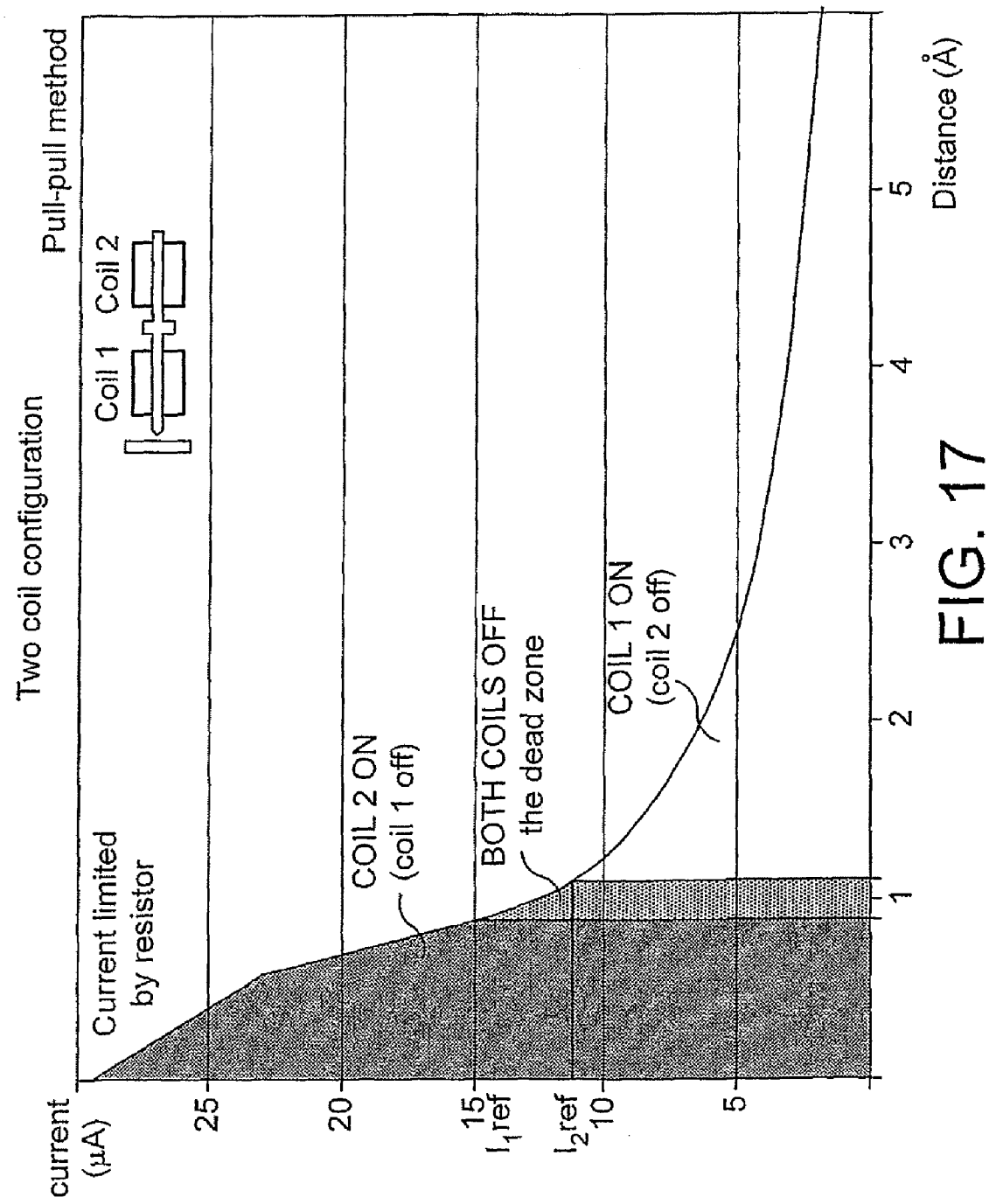
FIG. 17 illustrates the operation of a typical two-coil configuration.

Two current limits may also be maintained in order to facilitate operation of the bi-directional embodiments, for example where two coils are used. FIG. 17 shows for example the pull-pull method in which a first coil is actuated when the a current is above a second threshold. Between the first and second thresholds, both coils are switched off.

By suitable selection of one or more current thresholds, the device may be operated in a mode such that classical contact never occurs between the end of the pin and the plate. There may be applications in which direct contact is undesirable, particularly where direct physical contact could damage either pin or plate or, alternatively, could sufficiently alter the molecular structure so as materially to effect the operation of the device. Unexpectedly, however, it has been found in practice that physical contact between the pin and the plate, even quite hard physical contact, does not appear to have much effect on the ability of the device to resolve small movements.

In embodiments in which the pin is being pushed or pulled toward the plate by some actuator such as an electromagnetic coil, the pin movement may be stopped in a variety of ways. One way would be to rely on the friction between the pin and the supports, another would be to make use of a clamping arrangement, and yet another possibly to rely upon field effects which occur between the tip of the pin and the plate. Likewise, if the pin is being pushed or pulled away from the plate, it could be stopped by friction or by some clamping arrangement.

Figure 18:
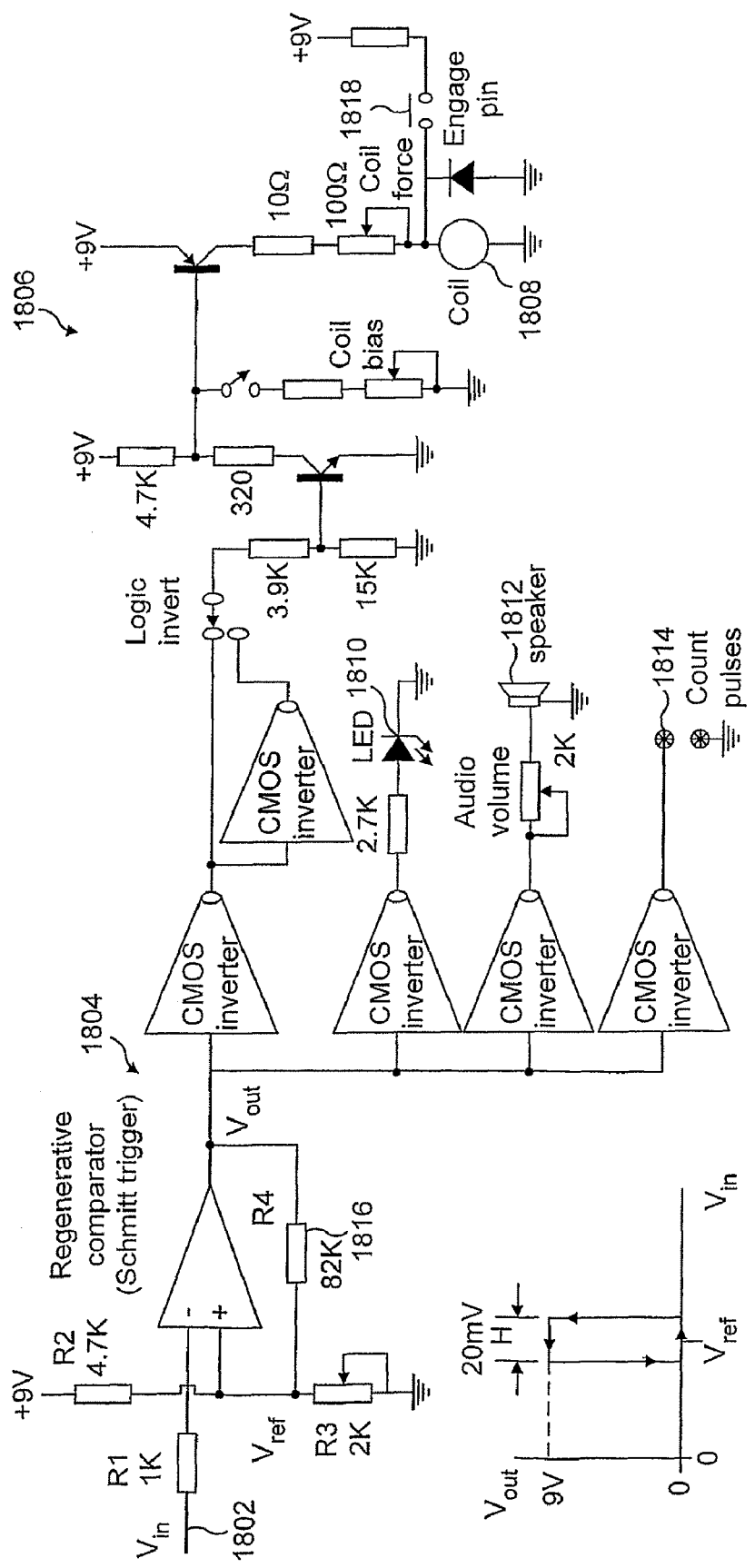
FIG. 18 illustrates the comparator and coil driver circuits.

FIG. 18 shows the comparator and coil driver circuitry in one specific embodiment. The voltage on the pin is measured at 1802 and is applied to a comparator 1804, the output of which is applied to a coil driver circuit 1806 which drives the coil 1808. For analysis purposes, actuation of the coil also drives an LED 1810 a speaker 1812 and a pulse counter 1814. A required level of hysteresis is created by means of a resistor 1816; this could if desired be user selectable and/or adjustable. A pin engage switch 1818 is provided, the operation of which bypasses the control circuitry and simply energises the coil to force the pin to engage the plate.

Figure 19:
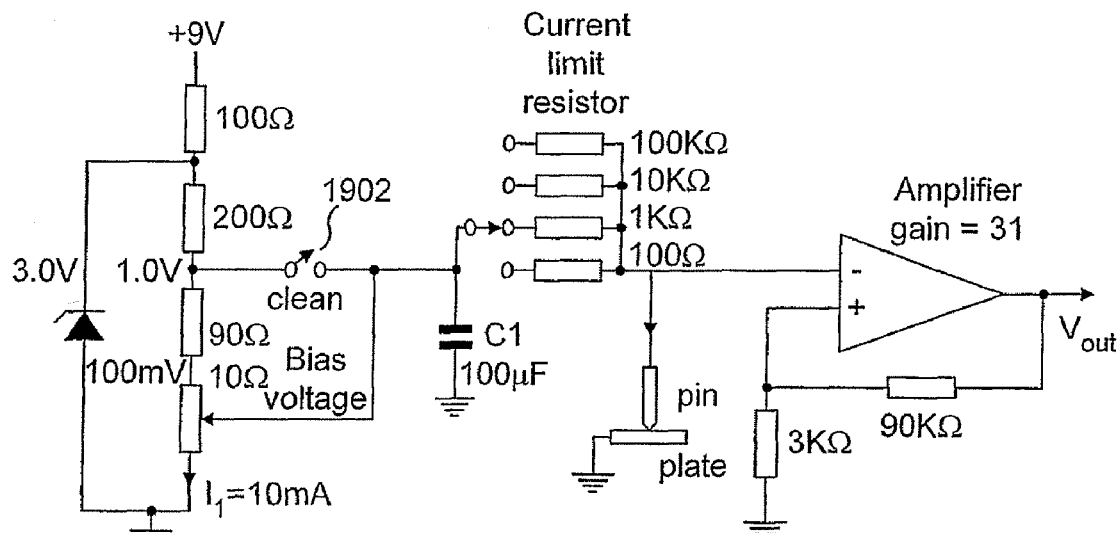
FIG. 19 shows the cleaning and the output circuitry.

FIG. 19 shows the circuitry for applying and measuring the voltage/current between the pin and the plate. A cleaning switch 1902 is provided, the purpose of which is to apply a potential of one volt to the pin in order to remove any water/impurities.

Figure 20:
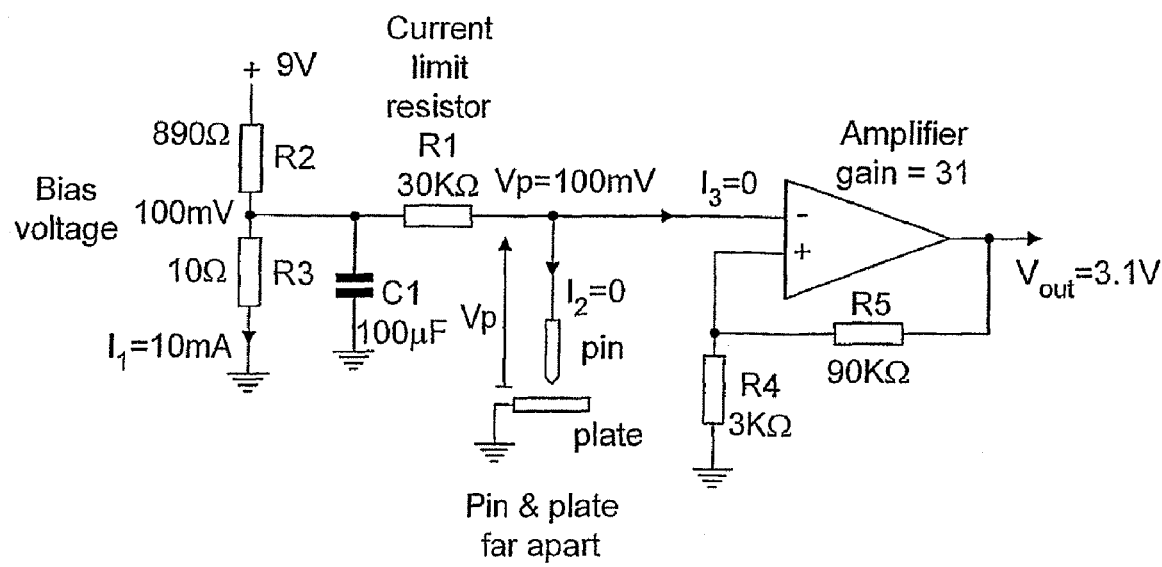
FIG. 20 shows the output circuitry when the pin and the plate are far apart.
Figure 21:
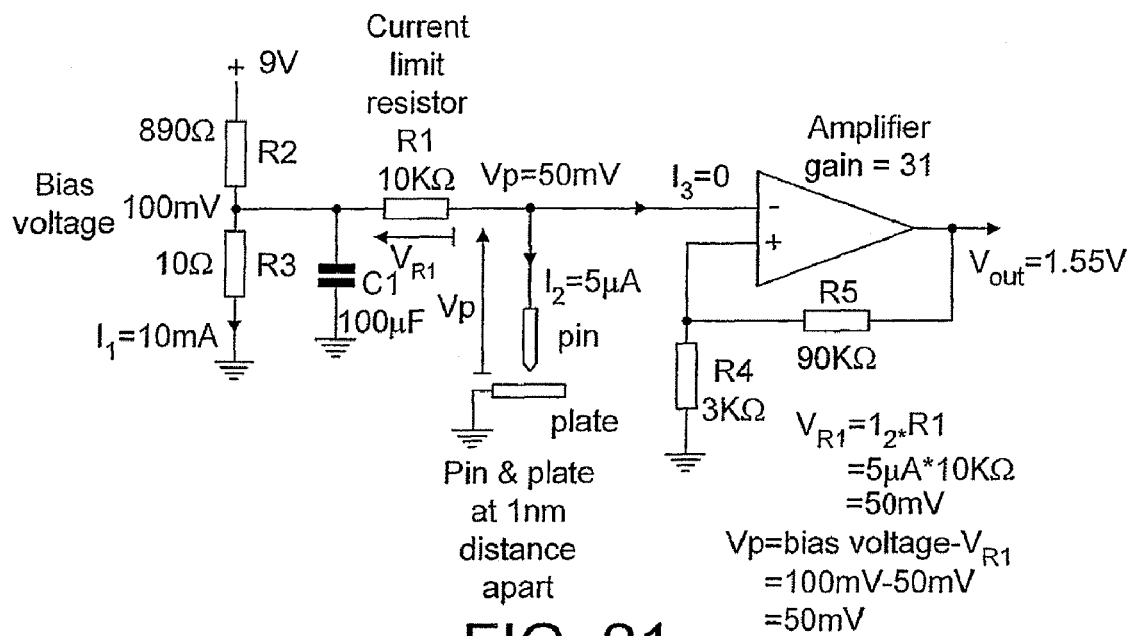
FIG. 21 shows the same circuitry when the pin and the plate are close to one another.

FIG. 20 shows the currents and voltages when the pin and the plate are far apart, and FIG. 21 shows the currents and voltages when they are close together, for example at a separation of 1 nanometre.

Figure 22:
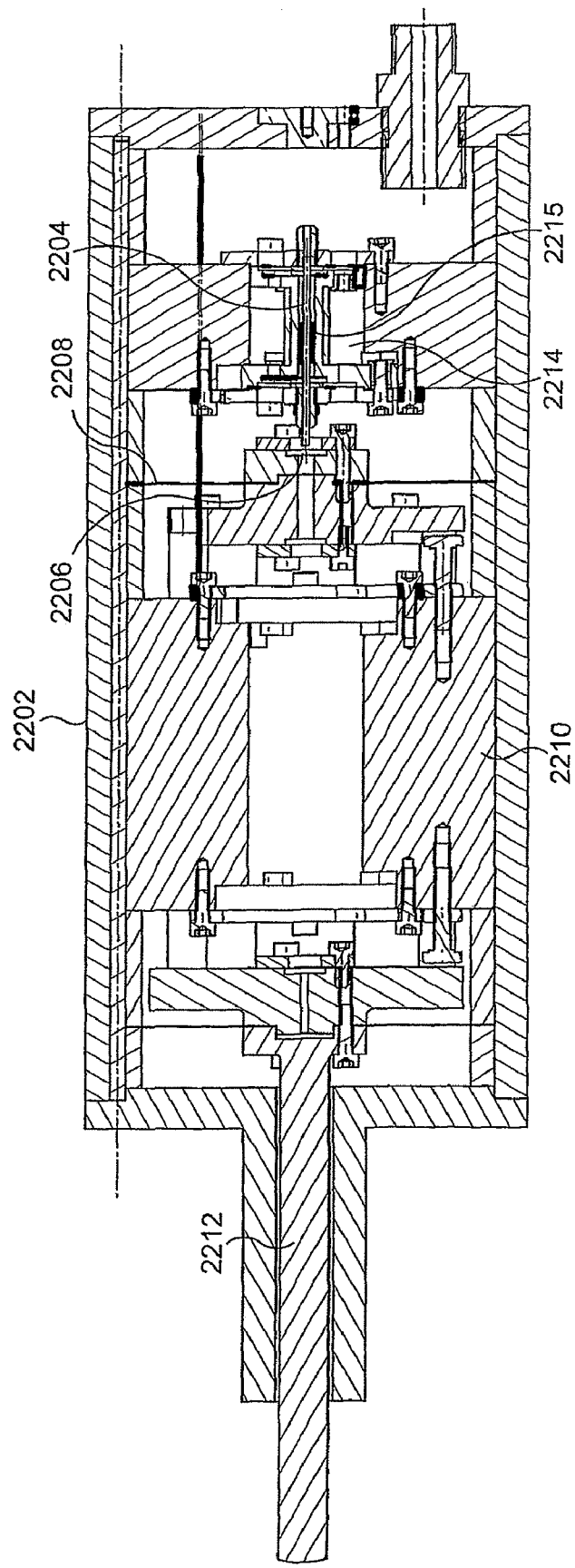
FIG. 22 shows another configuration.

FIG. 22 shows a more specific embodiment of a unidirectional version of the device. The device has a cylindrical housing 2202 mounted within which is a slide-in assembly holding a moveable pin 2204 and a separately movable gold plate 2206, mounted to a spiral spring diaphragm 2208. Movement of the plate 2206 with respect to the housing 2202 is transmitted via an assembly 2210 to a rod 2212. An electromagnetic coil 2214 surrounds the pin 2204, and controls movement of the pin towards or away from the plate 2206, depending upon the position of the soft iron core 2215 which surrounds the pin.

Figure 23:
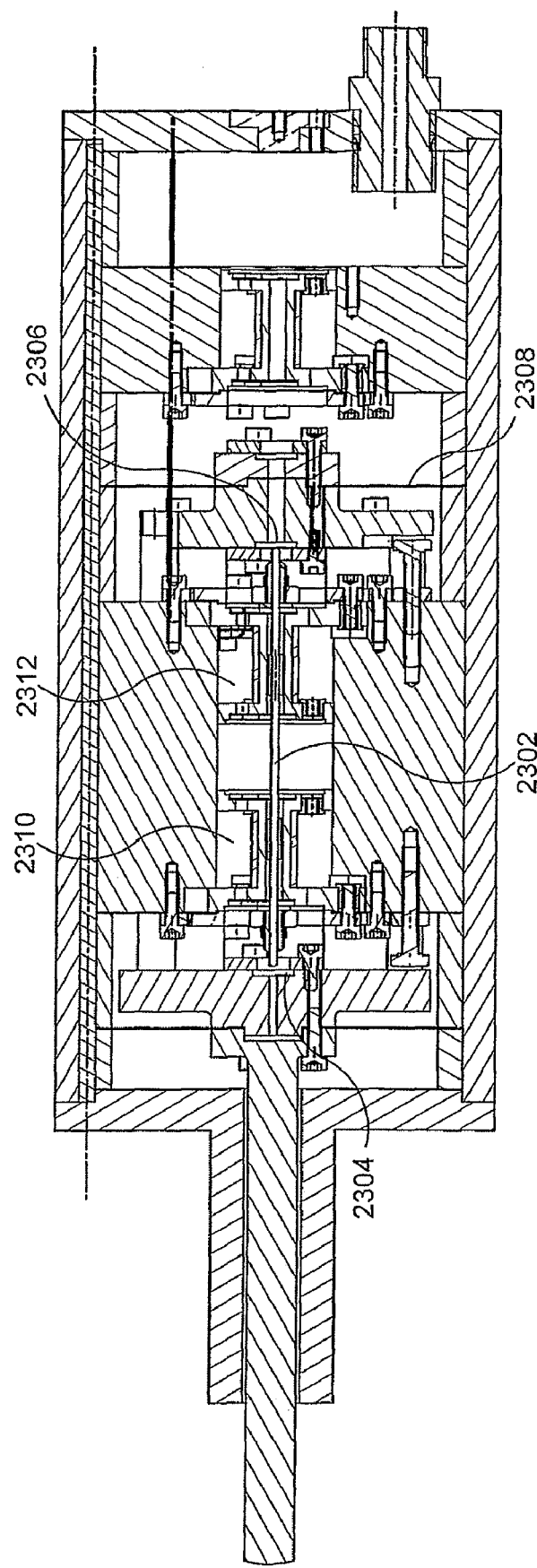
FIG. 23 shows a further configuration of the embodiment of FIG. 22.

A bidirectional version of the device is shown in FIG. 23. Here, a long central pin 2302 extends between first and second gold plates 2304, 2306, the plates being commonly mounted on a spiral spring 2308.

The pin 2302 is mounted for longitudinal movement, motion in one direction being controlled by a first coil 2310 and in the other by a second coil 2312.

In test prototypes it has been found that operation of the device improves following the initial application of a cleaning pulse to the pin. Also, it is found in practice that operation is more consistent if the pin is "exercised" before measurements are taken.

It will be understood that any of the features of the embodiments described may be used in conjunction with any compatible features of any of the other embodiments. Similarly, any of the specific devices and variations described may be used in conjunction with any of the various applications shown in FIGS. 8A to 8E.

We claim:

1. A micromovement device comprising:
    a. a housing having a diaphragm;
    b. a first movable element located on a first side of said diaphragm;
    c. a second movable element located on a second side of said diaphragm;
    d. an actuator mounted on said diaphragm intermediate said first moveable element and said second moveable element; and
    e. a controller that is operatively coupled to said first moveable element, said second moveable element and said actuator, said controller being configured to detect
        i. a first current flowing between first moveable element and said diaphragm,
        ii. a second current flowing between said second moveable element and said diaphragm,
    wherein
        when said first current is above a first predetermined threshold current and said second current is above a second predetermined threshold current, said actuator is not energized, and
        when one of said first current and said second current drops below said respective first predetermined threshold and said second predetermined threshold, said controller causes said actuator to energize and move at least one of said first moveable element and said second moveable element with respect to said diaphragm.

2. The micromovement device of claim 1, wherein each of said first moveable element and said second moveable element are pins.

3. The micromovement device of claim 1, wherein said diaphragm is formed from copper.

4. The micromovement device of claim 1, said housing further comprising a first air inlet positioned on said first side of said diaphragm and a second air inlet positioned in said housing on said second side of said diaphragm.

5. The micromovement device of claim 1, wherein said actuator is an electrostatic actuator.

6. The micromovement device of claim 1, wherein said actuator is a piezoelectric actuator.

7. The micromovement device of claim 1, wherein said actuator pulls said least one of said first moveable element and said second moveable element toward said diaphragm.

8. The micromovement device of claim 1, wherein said diaphragm is grounded to earth.

9. The micromovement device of claim 1, wherein when said actuator moves said least one of said first moveable element and said second moveable element with respect to said diaphragm, said actuator generates a measurable pulse that is counted by said controller to provide a measurement of the movement.

10. The micromovement device of claim 1, wherein said actuator is an electromagnetic coil, said coil when actuated applying a force to said at least one of said first moveable element and said second moveable element.

11. The micromovement device of claim 1, wherein said actuator further comprises a first portion for moving said first moveable element and a second portion for moving said second movable element with respect to said diaphragm.

12. The micromovement device of claim 11, wherein said actuator first portion is a first electromagnetic coil and said actuator second portion is a second electromagnetic coil.

13. The micromovement device of claim 1, wherein said first predetermined threshold current and said second predetermined threshold currents are different.

14. A micromovement device comprising:
   a. a housing having a diaphragm mounted therein;
   b. a first conductive element moveably mounted in said housing on a first side of said diaphragm;
   c. a second conductive element moveably mounted in said housing on a second side of said diaphragm;
   d. an actuator mounted in said housing and operatively coupled to said first and said second conductive elements such that said actuator can move at least one of said first and said second conductive elements with respect to said diaphragm; and
   e. a controller operatively coupled to said first conductive element, said second conductive element and said actuator, said controller configured to detect
      i. a first current flowing between said first conductive element and said diaphragm, and
      ii. a second current flowing between said second conductive element and said diaphragm.

15. The micromovement device of claim 14, wherein said actuator is mounted to and moves with said diaphragm.

16. The micromovement device of claim 14, wherein
   a. when said device is in a first state, said first conductive element and said second conductive element are in physical contact with said diaphragm, and
   b. when said device is in a second state, one of said first conductive element and said second conductive element is not in physical contact with said diaphragm.

17. The micromovement device of claim 16, wherein when said device is in said second state, said actuator is energized for a predetermined period of time so as to cause said one of said first conductive element and said second conductive element to move toward said diaphragm.

18. The micromovement device of claim 17, wherein said actuator is repeatedly energized for said predetermined period of time until said one of said first conductive element and said second conductive element is in physical contact with said diaphragm.

19. The micromovement device of claim 18, further comprising a counter for counting the number of times said actuator is energized so that a distance may be determined based on the number of times said actuator is energized.

20. The micromovement device of claim 14, wherein said diaphragm is a pressure-sensitive flexible membrane.

21. A micromovement device comprising:
   a. a housing having a diaphragm mounted therein, wherein at least a portion of said diaphragm is conductive;
   b. a first conductive element moveably mounted in said housing on a first side of said diaphragm;
   c. a second conductive element moveably mounted in said housing on a second side of said diaphragm;
   d. an actuator mounted in said housing and operatively coupled to said first and said second conductive elements such that said actuator can move at least one of said first and said second conductive elements with respect to said diaphragm; and
   e. a controller operatively coupled to said first conductive element, said second conductive element and said actuator, said controller configured to detect one of
      i. a first current and a first voltage between said first conductive element and said conductive portion of said diaphragm and
      ii. a second current and a second voltage between said second conductive element and said conductive portion of said diaphragm,
      wherein when one of said one of said first current and said first voltage and said one of said second current and said second voltage changes with respect to a predetermined threshold, said actuator is energized for a predetermined period of time causing said at least one of said first and said second conductive elements to move with respect to said diaphragm.

* * * * *